(12) United States Patent
Gampe et al.

(10) Patent No.: US 6,431,515 B1
(45) Date of Patent: Aug. 13, 2002

(54) CEILING-SUPPORTED SUSPENSION MEANS

(75) Inventors: Uwe Gampe, Flörsheim; Ulrich Kolloch, Seligenstadt; Achilleas Leontidis, Aschaffenburg, all of (DE)

(73) Assignee: Heraeus Med GmbH, Hanau (DE)

( * ) Notice: Subject to any disclaimer, the term of this patent is extended or adjusted under 35 U.S.C. 154(b) by 0 days.

(21) Appl. No.: 09/665,847

(22) Filed: Sep. 20, 2000

(30) Foreign Application Priority Data

Sep. 21, 1999 (DE) .......................................... 199 45 081

(51) Int. Cl.[7] .................................................. A47H 1/10
(52) U.S. Cl. ............................ 248/324; 362/147; 172/4
(58) Field of Search ................................ 362/147, 421, 362/272, 427, 404, 419; 172/4; 248/324, 282.1, 284.1, 610, 281.11

(56) References Cited

U.S. PATENT DOCUMENTS

| | | | | |
|---|---|---|---|---|
| 1,796,354 A | * | 3/1931 | Ahlberg | 248/342 |
| 2,164,390 A | * | 7/1939 | Dickerson | 248/282 |
| 3,010,013 A | | 11/1961 | Günther et al. | |
| 3,164,355 A | * | 1/1965 | Seitz et al. | 248/324 |
| 4,821,159 A | * | 4/1989 | Pike | 362/285 |
| 4,953,821 A | * | 9/1990 | Reuter et al. | 248/276 |
| 5,037,053 A | * | 8/1991 | Fox et al. | 248/278 |
| 5,429,336 A | * | 7/1995 | Ko | 248/278 |
| 5,490,652 A | * | 2/1996 | Martin | 248/282.1 |

FOREIGN PATENT DOCUMENTS

DE 297 23 699 U1 4/1999

* cited by examiner

*Primary Examiner*—Kimberly T. Wood
(74) *Attorney, Agent, or Firm*—Cohen, Pontani, Lieberman & Pavane

(57) ABSTRACT

A ceiling-supported suspension mechanism for a piece of equipment, in particular for operating lights, has a pivot arm, as extension, which is arranged on the rotary bearing of a ceiling mount such that it can be rotated about a vertical axis. The pivot arm has two sub-arms which are connected to one another by an intermediate articulation which can be rotated about a vertical axis. The two sub-arms of the pivot arm are arranged at the same height such that they can be pivoted in a horizontal plane. The intermediate articulation can be pivoted merely in a limited angle range of up to 110°, as a result of internal stops. The sub-arm which is remote from the rotary articulation is provided, at its outer end, with an articulation which can likewise be rotated about a vertical axis and on which there is fastened a carrying arm for the suspension mechanism. It is possible for the carrying arm to be pivoted through 360°.

3 Claims, 2 Drawing Sheets

CEILING-SUPPORTED SUSPENSION MEANS

BACKGROUND OF THE INVENTION

1. Field of the Invention

The invention relates to a ceiling-supported suspension means for a piece of equipment, having a pivot arm, as an extension, which is arranged on the rotary articulation of a ceiling mount such that it can be rotated about a vertical axis. The pivot arm comprises two sub-arms which are connected to one another by an intermediate articulation which can be rotated about a vertical axis. The intermediate articulation can be rotated merely in a limited angle range, as a result of internal stops. The sub-arm which is remote from the rotary articulation is provided, at its outer end, with an articulation which can likewise be rotated about a vertical axis and on which there is fastened a carrying arm which can be pivoted through 360°.

2. Discussion of the Prior Art

U.S. Pat. No. 3,010,013 discloses a ceiling-supported suspension means for an operating light in the case of which an extension has a first arm with two ends which are positioned at different heights. One end of the arm is connected to a rotary articulation of a ceiling mount. The rotary articulation can be pivoted about a first vertical axis, while the lower end of the first arm is provided with an intermediate articulation which can be rotated about a second vertical axis and is connected to one end of a second arm via the intermediate articulation. The likewise obliquely running second arm has, at its bottom end, an articulation which is arranged ben e intermediate articulation and can be rotated about a third vertical axis. On account of the different heights of all three articulations, it is possible to adjust the light in the radial direction even with a rectilinear positioning between the light housing and ceiling fastening point, since, with radial loading—in particular if the operating-light housing is located in the vicinity of the rotary articulation of the ceiling—the intermediate articulation will lead to a bending-in action, with the result that the lamp position can be adjusted without difficulty. Even with the full pivoting capacity on account of the different heights of all three articulations, the vertical staggering of the three articulations results in the loss of a comparatively large proportion of the space in the upper region of the operating room for the adjustability of the operating light, with the result that, in some circumstances, only a very limited vertical adjustment of the operating light is possible.

SUMMARY OF THE INVENTION

Taking as departure point a suspension means as is known from U.S. Pat. No. 3,010,013, the object of the present invention is to improve the capacity for movement of a housing of a piece of equipment or of an object such that, with a rectilinear positioning of the extension or pivot arm and carrier arm of the light-suspension means, a so-called dead-center position is avoided and, at the same time, sufficient vertical adjustability of the light can be ensured.

The object is achieved in that the two sub-arms of the pivot aim are arranged at the same height such that they can pivoted in a horizontal plane. The suspension means can be used, for example, as the suspension means for an operating light.

It has proven advantageous that, in particular when an operating light or a suspended object is located in the vicinity of the axis of rotation of the rotary bearing, a high level of variability for the extension is provided by the intermediate articulation, and thus additional degrees of freedom are provided for the movement of the object. In a preferred configuration of the invention, the two sub-arms are arranged such that they can be pivoted in a common horizontal plane, the two sub-arms of the pivot arm or the extension being arranged such that they can be pivoted in a range from 0 to ±110° in relation to one another.

It has proven further advantageous that the extension can be more or less variable in length by the intermediate articulation, and thus provides additional degrees of freedom of movement for the suspended object. This is important, in particular, if the suspended object—for example the operating light—is located in the vicinity of the vertical axis of the rotary bearing of the ceiling mount, with the result that it is only possible to achieve poor lever action.

The intermediate articulation advantageously reduces the problem of dead-center positions since virtually always at least one articulation is deflected slightly, with the result that, when an attempt is made to move a suspended operating light, it is virtually always possible to move the suspension means to a sufficient extent.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
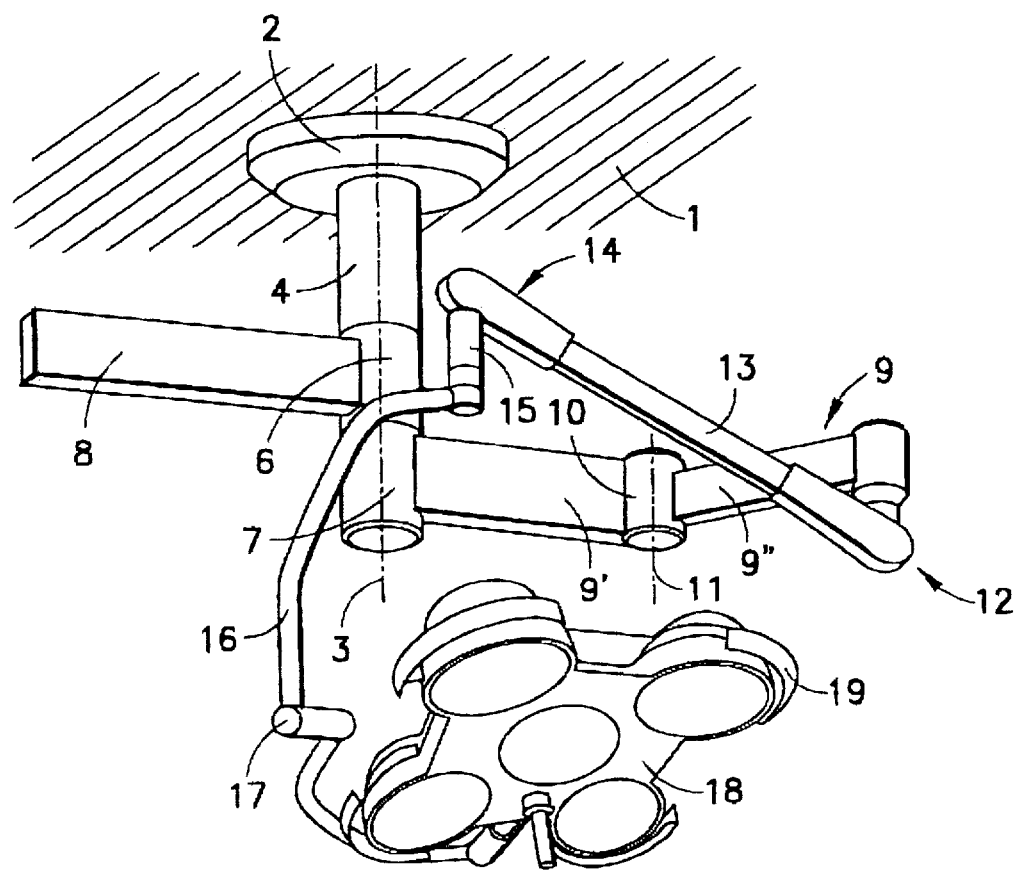
FIG. 1 shows, schematically, a means of suspending a suspension means according to the invention from the ceiling, only one pivot arm, as extension, being illustrated in full, while the other is indicated schematically.
Figure 2:
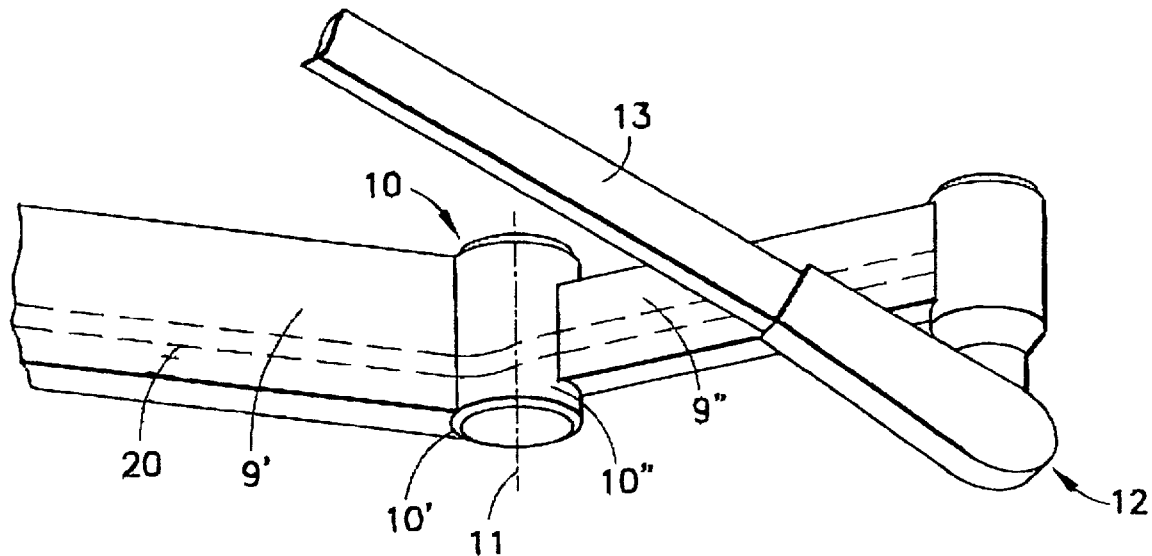
FIG. 2 shows, in detail form, the intermediate articulation of the pivot arm from FIG. 1 together with the resilient arm for suspending an operating light.

According to the FIG. 1, the suspension means according to the invention for an operating light comprises a ceiling mount 2 which is fastened on the symbolically illustrated ceiling 1 and from which a flanged tube 4 projects in the vertical direction along axis 3. The flanged tube 4 has two rotary bearings 6, 7, on which the sleeve-like slide bodies are mounted such that they can be rotated in each case through 360° without any stop. The slide bodies of the rotary bearings 6, 7 are each connected to an extension, as the pivot arm 8, 9, of which pivot arm 8 is illustrated only in part (with break-off location), while pivot arm 9 can be seen with both its sub-arms 9', 9" which are connected to one another via an intermediate articulation 10 such that they can be pivoted in a common horizontal plane. The housing 10' of the intermediate articulation 10 according to FIG. 2 is connected rigidly to the first sub-arm 9', it being possible to see, within the intermediate articulation 10, an articulation head 10" which can be rotated about the vertical axis 11 and is mechanically fixed, on its cylinder periphery, to the second sub-arm 9". This means that, as the outer end of sub-arm 9" moves about the rotary bearing 7 or about intermediate articulation 10, this always results in a pivoting movement in a horizontal plane without any kind of tilting movement.

Figure 3:
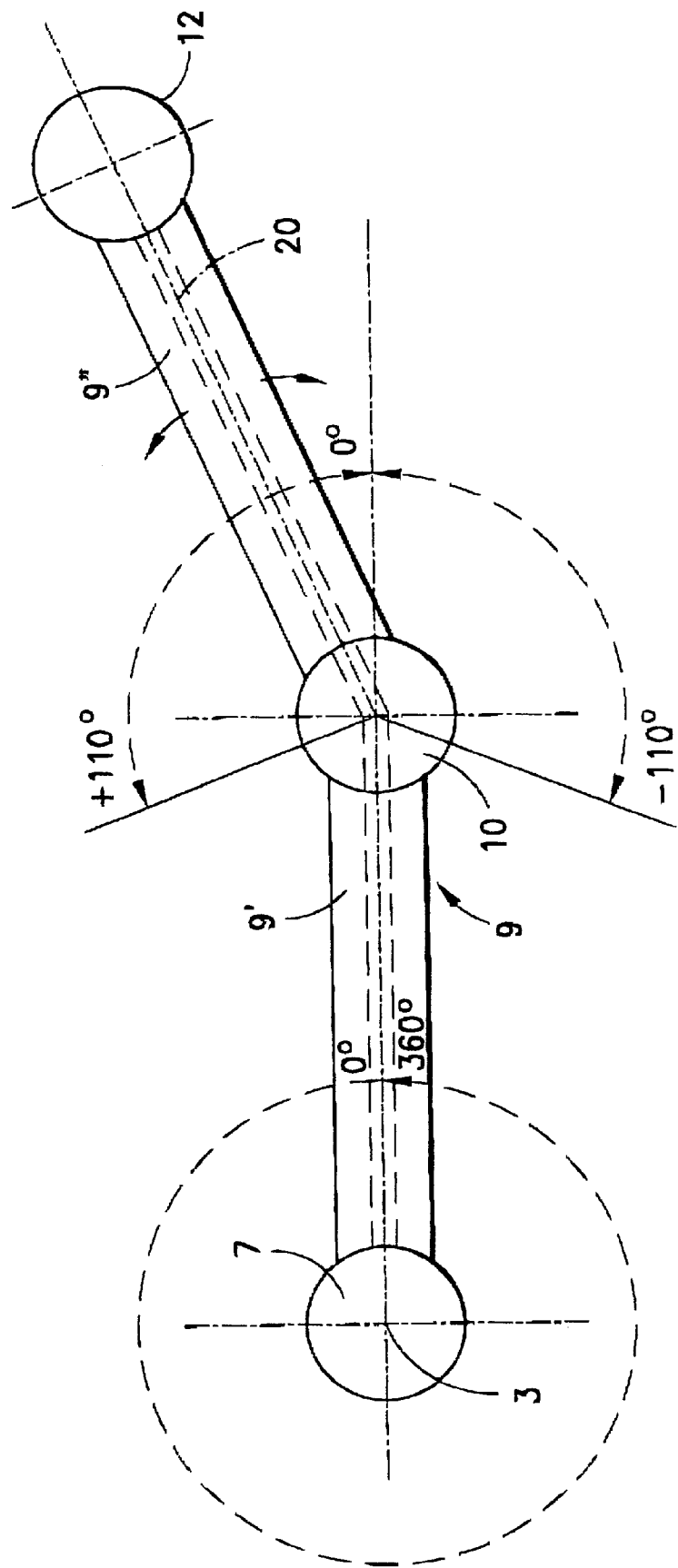
FIG. 3 is a schematic top view of the pivot arm.

The intermediate articulation is pivotable only in a limited range, as shown in FIG. 3. Provided at the outer end of the second sub-arm 9" is an articulation connection 12 with a connected resilient arm 13, of which the outer end, in turn, is connected to an articulation connection 14, on which there is fastened a rotary articulation 15 for a connected lamp bracket 16. Located at the end of the lamp bracket 16 is a bearing 17 on which the operating light 18 is mounted in a rotatable manner, in order to achieve an optimum angle of irradiation. The "cardanic" adjustment of the operating light 18 takes place via laterally fitted handles 19. It can be seen with reference to FIG. 1 that intermediate articulation 10 is utilized, in particular, when the operating light 18 is located in the vicinity of the flanged-tube axis 3 and there is a lever arm of virtually zero between the operating light 18 and its suspension means in relation to axis 3. In this case, intermediate articulation 10 assumes a type of bending function and thus straightforwardly allows easier adjustability, as is necessary, in particular, during surgical procedures.

FIG. 2, which has already been explained above, essentially corresponds to a detail from FIG. 1, although in this case the articulation housing and articulation head can be seen to better effect.

It can be seen from the detail-form illustration of FIG. 2 that intermediate articulation 10 comprises an articulation housing 10' and an articulation head 10" which is mounted in a rotatable manner therein along the axis 11.

Power is transmitted in the interior of the intermediate articulation 10 by way of a flexible cable 20; however, it is also possible to use cylindrical sliprings in the articulation housing 10', which are sensed by slipring sensors in the region of rotation of the articulation head 10' and transmit electrical energy and, if appropriate, signals.

We claim:
1. A ceiling-supported suspension for a piece of equipment, comprising: a ceiling mount having a rotary bearing; a pivot arm arranged so as to extend from the rotary bearing of the ceiling mount so that the pivot arm can be rotated about a vertical axis, the pivot arm including two sub-arms which are connected to one another by an intermediate articulation which can be rotated about a vertical axis, the intermediate articulation being pivotable in a limited angle range, the sub-arm which is remote from the rotary bearing having an outer end with an articulation which can be rotated about a vertical axis; and a carrying arm mounted to the articulation at the outer end of the remote sub-arm so that the carrying arm can be pivoted through 360°, the two sub-arms of the pivot arm being arranged at a common height so that they can be pivoted in a common plane in an angle range from 0 to ±110° in relation to one another, the rotary bearing of the pivot arm and the intermediate articulation being arranged in one plane.

2. A ceiling-supported suspension as defined in claim 1, and further comprising a flexible line provided for transmitting electrical energy and signals in the intermediate articulation.

3. A ceiling-supported suspension as defined in claim 1, and further comprising an operating light mounted to the carrying arm.

* * * * *